Oct. 8, 1929.  J. F. O'CONNOR  1,730,824
CAR CONSTRUCTION
Filed July 27, 1928
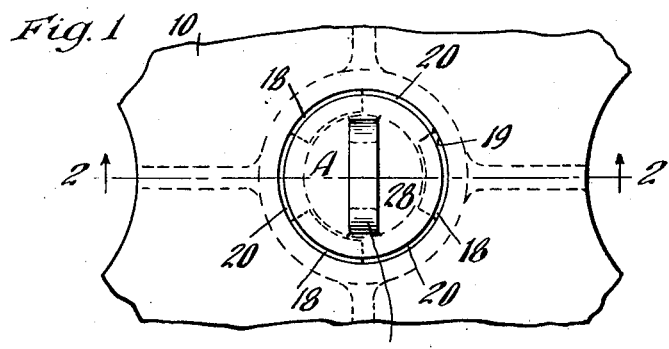
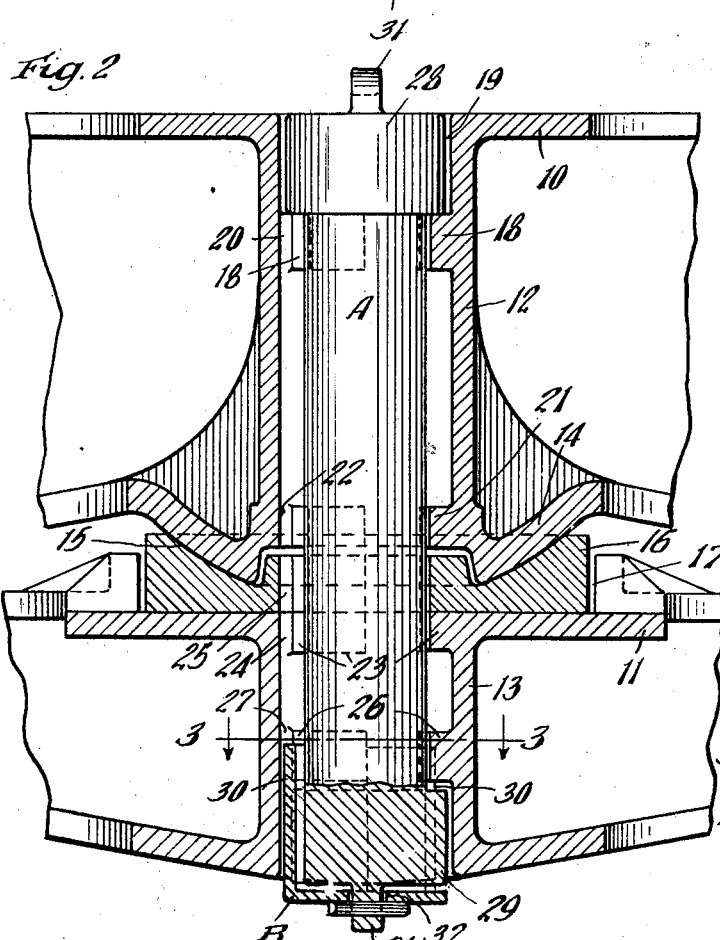
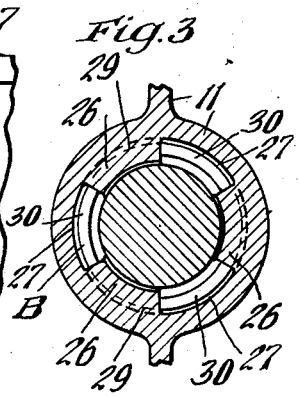
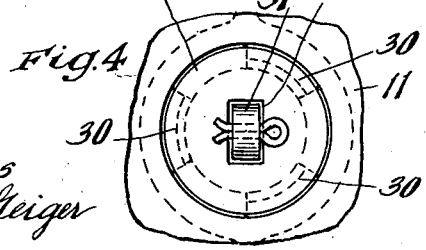
Inventor
John F. O'Connor
Witness
Wm. Geiger
By Joseph Harris
His Atty.

Patented Oct. 8, 1929

1,730,824

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

CAR CONSTRUCTION

Application filed July 27, 1928. Serial No. 295,653.

This invention relates to improvements in car construction.

One object of the invention is to provide means for connecting the body and truck bolsters of railway cars, especially in connection with cars of the passenger type, including a combined center and locking pin arrangement of substantial construction throughout, providing exceptional strength to prevent shearing off or breaking under tension strains, especially when the car is in collision, to thereby maintain connection between the trucks and the body of the car and thus avoid telescoping, wherein the pin is of one-piece construction and is designed to be readily inserted and removed when desired, and which is held against turning with respect to one of the bolsters by locking means having shouldered engagement with the cooperating bolster.

Other and further objects of the invention will more clearly appear from the description and claims hereinafter following.

In the drawing, forming a part of this specification, Figure 1 is a top plan view of a portion of the body bolster of a railway car, illustrating my improvements in connection therewith. Figure 2 is a vertical sectional view, corresponding substantially to the line 2—2 of Figure 1, taken through the body and truck bolsters. Figure 3 is a horizontal sectional view, corresponding substantially to the line 3—3 of Figure 2. And Figure 4 is a bottom plan view of the central portion of the truck bolster, as shown in Figure 2.

In said drawings, 10 indicates generally the body bolster of the railway car and 11 the truck bolster. The body bolster is provided with a cylindrical sleeve-like portion 12, connecting the top and bottom webs and the vertical webs of the body bolster casting, adapted to receive the center locking pin. The truck bolster 11 is provided with a similar sleeve-like section 13, which also accommodates the center pin locking member. As shown in Figure 2, most clearly, the cylindrical sleeve-like sections 12 and 13 of the body and truck bolsters are in axial alignment. The bottom portion of the body bolster 10 is provided with a spherical bearing projection 14, adapted to seat within a bearing pocket 15 provided in a bearing block 16 at the top of the truck bolster 11. The bearing block 16 is seated in the usual pocket 17 provided at the top of said bolster.

In carrying out my invention, I provide a center pin arrangement comprising, broadly, an integral pin member A, headed at opposite ends, a locking member B for preventing relative rotation of the pin A and one of the bolsters, the bolsters having the cylindrical pin receiving sleeve sections thereof formed with shoulders, which are so formed as to permit assembling of the pin with the bolsters and engagement of the head portions of the pin therewith, so as to lock the bolsters to each other.

The sleeve section 12 of the body bolster 10 is provided with a curved, relatively wide rib 18, adjacent the upper end thereof, thereby providing a head receiving pocket 19. The rib 18 is cut away at three spaced sections, as indicated at 20—20.

Adjacent the lower end of the tubular sleeve 12 an interior rib, similar to the rib 18, is also provided, the last named rib being designated by 21 and being cut away at three spaced sections, as indicated at 22—22, the solid sections and the cut-away sections of the rib 21 being in vertical alignment with the corresponding sections of the rib 18. The truck bolster is also provided with a rib 23 at the top end portion of the sleeve 13, the rib 23 being cut away at three spaced sections 24—24, the cut-away portions of the rib and the solid sections thereof corresponding in size to the similar portions of the ribs 18 and 21, hereinbefore described. The bearing plate 16 of the truck bolster is provided with a central opening corresponding in size to the opening between the opposite walls of the rib sections 23 of the bolster 11, and the block is cut out at three sections to one side of the opening, as indicated at 25, the cut-away portions being aligned with the cut-away sections 24 of the rib 23. Adjacent the lower end, the sleeve 13 of the truck bolster is provided with an additional interior rib 26, similar to the rib 23, hereinbefore described, the same having three sections thereof cut away, as indicated at 27, the cut-away sections and the solid portions of the rib 26 being in vertical alignment with the similar portions of the rib 23.

My improved locking pin proper comprises a main shank portion, adapted to fit within the openings between diametrically opposite portions of the ribs 18, 21, 23 and 26, the shank being of substantially cylindrical form and provided with an integral solid head 28 at the upper end thereof, the head 28 being of substantially cylindrical form so as to fit within the pocket 19.

At the opposite end, the shank of the pin is provided with three horizontally extending wing portions 29—29, which together define a head member adapted to fit within the pocket of the truck bolster below the rib 26. Each wing portion 29 corresponds in width to the solid sections of the rib 26 and is of such a size as to pass freely through the openings or cut-away portions between the sections of the ribs 18, 21, 23 and 26. By providing the wings 29 at the bottom end of the pin A, a head of cylindrical form, slotted vertically at three spaced points, is provided. As will be evident, the pin A may be assembled with the body and truck bolsters of the car, either by inserting the same through the opening of the truck bolster from the top or through the opening of the body bolster from the bottom. When the pin is inserted through the pin receiving openings of the body and truck bolsters, the wing portions 29 of the pin will pass between the solid sections of the ribs 18, 21, 23 and 26, and when the pin is in the position shown in Figure 2, the same may be rotated so as to bring the wing portions 29 thereof into shouldered engagement with the solid sections of the rib 26, thereby preventing removal of the pin endwise and holding the bolsters assembled.

In order to lock the pin against rotation with respect to one of the bolsters, so that there will be no danger of the wings 29 becoming disengaged from the rib 26, I provide the locking cap member B, which includes a disc-like portion fitting over the bottom end of the pin, and three upstanding fingers 30—30, which are of such a width as to occupy the spaces between the wings 29 and also the spaces between the solid sections of the rib 26, the fingers being of such a length as to extend beyond the wings 29 and overlap the solid sections of the rib 26 a substantial distance. As will be evident, when the locking member B is assembled with the pin, the latter will be locked against rotation with respect to the bolster 11 by engagement of the wings 29 with the fingers 30 and by the fingers being interlocked with the solid sections of the rib 26.

In order to manipulate the pin in assembling the same with the bolsters, the heads at the opposite ends thereof are preferably provided with outstanding eye members 31—31. The disc portion of the locking cap or member B is provided with an opening 32, adapted to accommodate the eye member at the bottom end of the pin A, and a cotter pin is employed to hold the locking member in position, the cotter pin, as shown, extending through the opening of the eye member 31.

While I have herein shown and described what I consider the preferred manner of carrying out my invention, the same is merely illustrative and I contemplate all changes and modifications which come within the scope of the claims appended hereto.

I claim:

1. In car construction, the combination with body and truck bolsters having aligned center pin openings, each bolster being provided with a shoulder adjacent its opening; of a center pin having a head at each end, the shape of one of said heads and the cross section of the opening at said shouldered portions being such that the pin may be inserted therethrough while in one position, but is prevented from passing therethrough when given a partial turn; means having shouldered engagement with the bolster for locking said pin against turning with respect to the bolster with which said head cooperates; and means for securing said locking means to the pin.

2. In car construction, the combination with body and truck bolsters having aligned center pin receiving openings, each bolster being provided with a plurality of spaced shoulders in annular series at the outer end of the opening thereof; of a center pin having a head at each end, one of said heads being slotted lengthwise of the pin at spaced points to provide clearance for said shoulders in assembling the pin with the bolsters, said pin being rotatable to bring said last named head into shouldered engagement with the spaced shoulders of the bolster; and a locking element having fingers engaged within said slotted portions of said head and between the shoulders of said bolster to lock the pin to the bolster against rotation, thereby preventing removal of the pin.

3. In car construction, the combination with body and truck bolsters having aligned center pin receiving openings, each bolster having at least three spaced shoulders arranged in annular series adjacent the outer end of the opening thereof; of a center pin having a solid head at one end thereof, engaging the shoulders of one of said bolsters to hold said pin against removal from said bolsters in one direction, said pin having at least three spaced wing portions at the other end thereof, engaging with the shoulders of the other bolster, to hold said pin against removal in a reverse direction, said pin being held against rotation with respect to said last named bolster by locking means having fingers engaging between the wings of said pin and the shoulders of the cooperating bolster.

4. In car construction, the combination with body and truck bolsters having aligned center pin receiving openings, the walls of the opening of each bolster being provided with spaced, horizontal ribs, arranged in annular series adjacent the outer end of the opening of each bolster; of a center pin extending through said openings and having a solid head at one end, having shouldered engagement with the ribs of one of said bolsters, said pin having a head at the other end, slotted to correspond with the ribs of the cooperating bolster, said pin being rotatable when being assembled with the bolsters to bring said slotted head in shouldered engagement with the ribs of the corresponding bolster, said heads of the pin, by the shouldered engagement thereof with the ribs of the bolsters, locking said bolsters together; and a locking cap fitting over said slotted head, said cap having arms engaging within the slots of the head and between the ribs of the corresponding bolster, to hold said pin against rotation with respect to said last named bolster.

In witness that I claim the foregoing I have hereunto subscribed my name this 25th day of July, 1928.

JOHN F. O'CONNOR.